(12) United States Patent
Diep et al.

(10) Patent No.: US 8,622,680 B1
(45) Date of Patent: Jan. 7, 2014

(54) GROMMET

(75) Inventors: Tien T. Diep, West Bloomfield, MI (US); Girishsingh A. Moksahi, Sterling Heights, MI (US)

(73) Assignee: Newfrey LLC, Newark, DE (US)

( * ) Notice: Subject to any disclaimer, the term of this patent is extended or adjusted under 35 U.S.C. 154(b) by 21 days.

(21) Appl. No.: 13/535,764

(22) Filed: Jun. 28, 2012

(51) Int. Cl.
 *F16B 19/00* (2006.01)

(52) U.S. Cl.
 USPC .......................................... 411/508; 411/509

(58) Field of Classification Search
 USPC ........... 411/60.3, 63, 70, 80.2, 501–502, 508, 411/509, 510, 548
 See application file for complete search history.

(56) References Cited

U.S. PATENT DOCUMENTS

| | | | |
|---|---|---|---|
| 1,754,672 A | 4/1930 | Dyresen | |
| 3,350,976 A * | 11/1967 | Topf | 411/502 |
| 3,481,242 A * | 12/1969 | Topf | 411/502 |
| 3,611,861 A | 10/1971 | Schulze | |
| 3,733,655 A | 5/1973 | Kolibar | |
| 4,312,614 A | 1/1982 | Palmer et al. | |
| 4,524,494 A | 6/1985 | Sato et al. | |
| 4,527,821 A | 7/1985 | Tanaka | |
| 4,728,068 A | 3/1988 | Rivkin | |
| 4,978,265 A | 12/1990 | Wan | |
| 5,028,187 A * | 7/1991 | Sato | 411/48 |
| 5,288,189 A * | 2/1994 | Hepworth | 411/32 |
| 5,689,863 A | 11/1997 | Sinozaki | |
| 5,775,861 A | 7/1998 | Leon et al. | |
| 5,797,714 A * | 8/1998 | Oddenino | 411/508 |
| 5,851,097 A | 12/1998 | Shereyk et al. | |
| 6,209,175 B1 | 4/2001 | Gershenson | |
| 7,243,401 B2 * | 7/2007 | Sawatani | 24/297 |
| 7,306,419 B2 | 12/2007 | Lepper | |
| 7,344,331 B2 | 3/2008 | Kobayashi et al. | |
| 7,481,474 B2 * | 1/2009 | Higgins et al. | 296/1.08 |
| 7,549,830 B2 | 6/2009 | Cooley et al. | |
| 2007/0116537 A1 | 5/2007 | Glovak | |

* cited by examiner

*Primary Examiner* — Roberta Delisle
(74) *Attorney, Agent, or Firm* — Harness, Dickey & Pierce, P.L.C.

(57) ABSTRACT

A grommet has a tubular body with a bore coaxial to a body longitudinal axis. A flange is integrally connected to the body and is oriented perpendicular to the longitudinal axis. The bore extends through the flange. Multiple legs extend from the tubular body at a body end opposite to the flange. The legs are separated by an elongated slot permitting the legs to inwardly deflect from a non-deflected position toward the longitudinal axis by partially extending into the slot. A service tab assembly positioned in the central bore includes multiple tab extensions, each integrally connected to only one of the legs; and a pull tab positioned entirely in the bore in a non-extended position. The pull tab is connected only to the tab extensions and when displaced in a release direction acts through the tab extensions to equally inwardly displace the legs toward the longitudinal axis.

23 Claims, 4 Drawing Sheets

GROMMET

FIELD

The present disclosure relates to plastic fasteners used for retention of objects including air shields to body panels of an automobile vehicle, where subsequent removal of the fastener and object is desired.

BACKGROUND

This section provides background information related to the present disclosure which is not necessarily prior art.

Releasable fasteners are known that provide for deflection of two or more legs of a fastener toward each other to reduce a diameter of the legs to an aperture diameter of an object secured by the fastener. Known releasable fasteners commonly require the head or flange of the fastener to be contacted and/or rotated to displace and release the fastener, which can damage the flange and/or the object being secured. Many known releasable fasteners also require a force or pressure from a tool to be directed in an installation direction of the fastener and therefore toward the retained object to rotate the fastener for release. This additional force applied in the direction of the object can also damage the object or the aperture through which the fastener is installed.

SUMMARY

This section provides a general summary of the disclosure, and is not a comprehensive disclosure of its full scope or all of its features.

According to several aspects, a grommet includes a tubular body having a bore coaxially aligned with a body longitudinal central axis. Multiple legs extend from the tubular body. A service tab assembly is positioned in the central bore. The service tab assembly includes: multiple tab extensions, each integrally connected to only one of the legs; and a pull tab in a non-extended position located entirely in the bore, and connected only to each of the tab extensions. The pull tab when displaced in a release direction acts through the tab extensions to inwardly deflect each of the legs toward the longitudinal central axis.

According to further aspects, a grommet includes a tubular body having a through-bore coaxially aligned with a body longitudinal central axis. A first flange integrally connected to the body is oriented perpendicular to the longitudinal central axis. The through-bore extends also through the first flange. Multiple legs extend integrally from the body at a body free end oppositely positioned with respect to the flange. The legs are deflectable toward a body longitudinal axis. A service tab assembly is positioned in the through-bore. The service tab assembly includes: multiple tab extensions, each integrally connected to only one of the legs; and a pull tab positioned entirely in the through-bore in a non-extended position, and connected only to each of the tab extensions. The pull tab when displaced in a release direction acts through the tab extensions to equally inwardly displace each of the legs toward the longitudinal axis.

According to still further aspects, a grommet assembly includes a grommet including: a tubular body having a bore coaxially aligned with a body longitudinal central axis; a flange integrally connected to the body, the bore extending also through the flange; multiple legs extending integrally from the tubular body; and a service tab assembly positioned entirely in the central bore in a non-extended condition. The service tab assembly includes: multiple tab extensions, each integrally connected to only one of the legs; and a pull tab connected only to each of the tab extensions. A vehicle component has an aperture. The tubular body is slidingly received in the aperture until the flange contacts the vehicle component. A vehicle body panel has a panel aperture. The legs extend through the panel aperture. The pull tab when displaced in a release direction acts through the tab extensions to equally inwardly displace each of the legs toward the longitudinal axis such that the legs are slidable through the panel aperture to release the grommet.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figures 1, 2:
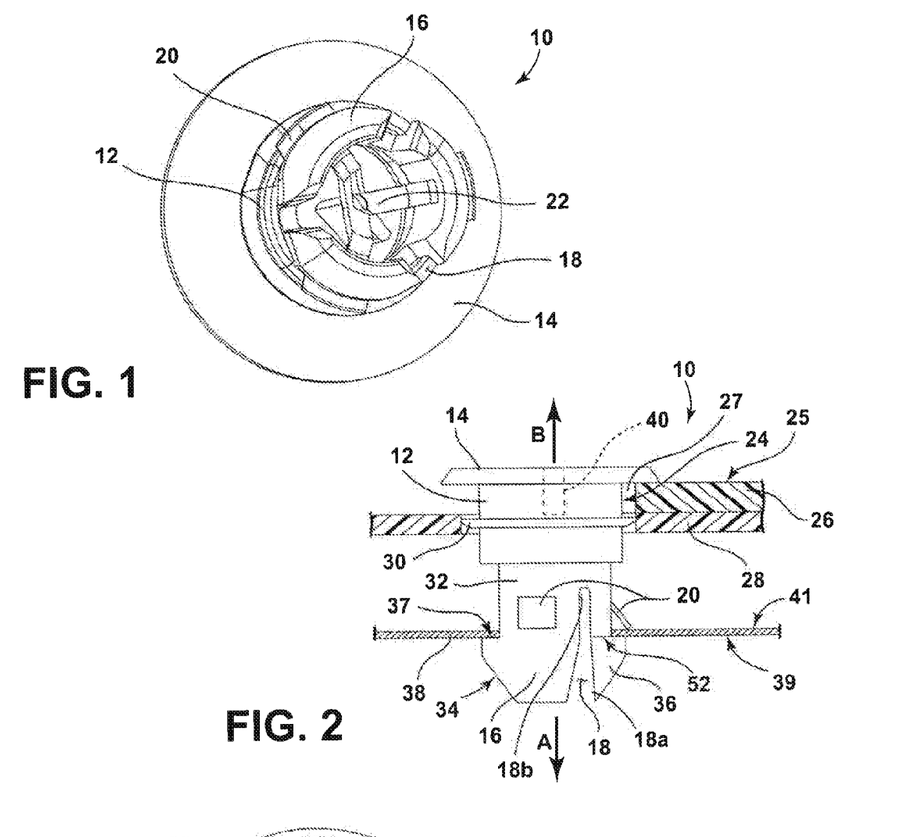
FIG. 1 is bottom perspective view of a grommet of the present disclosure.
FIG. 2 is a partial cross sectional front elevational view of the grommet of FIG. 1 shown in an installed condition retaining a vehicle component to a body panel of a vehicle.

Referring to FIG. 1, a grommet 10 includes a tubular body 12 extending perpendicularly from a first or body flange 14 having a surface area larger than a cross sectional area of the tubular body 12. Although tubular body 12 may according to several aspects be circular in cross section, tubular body 12 may also have an oval, rectangular, triangular or other geometric shape in cross section, with a substantially hollow interior cavity. The tubular body 12 at a free end has multiple deflectable legs 16 with successive ones of the deflectable legs 16 separated by an elongated slot 18 that permit the legs 16 to elastically deflect towards each other such that a portion of successive ones of the legs 16 can deflect inwardly into one of the elongated slots 18 from the normal non-deflected positions shown. Each elongated slot 18 can include an open end 18a which is wider than a closed end 18b, to provide for maximum bending of the deflectable legs 16 at the free ends of the deflectable legs 16. According to one aspect three legs 16 are provided, however, two, or more than three legs 16 can also be provided. A second or locating flange 20 is integrally connected to and extends outwardly from each of the legs 16.

A service tab assembly 22 is provided for removal of an installed grommet 10 which will be described later herein. Service tab assembly 22 is positioned within a hollow through-bore of tubular body 12 and is integrally connected only to the legs 16.

Referring to FIG. 2 and again to FIG. 1, grommet 10 having a circular cross section for tubular body 12 is shown in a completed installation position which is provided by insertion in an installation direction "A". Grommet 10 can be subsequently removed by application of a force acting in a release direction "B", thereby inducing no force in the installation direction "A". For the circular cross section aspect, first tubular body portion 24 of body 12 has a first diameter (diameter "C" shown in reference to FIG. 4). The body flange 14 contacts a face 25 of a vehicle component 26 such as an air shield, shown with the first tubular body portion 24 received in an aperture 27 of the vehicle component 26. It will be apparent that the geometry of aperture 27 can be modified to match the cross sectional geometry of tubular body 12. A separate washer 28 which is not integrally connected to grommet 10 is received from an opposite side of vehicle component 26 and engages a second flange 30 having a diameter "D" (shown in FIG. 4) smaller than diameter "C". Second flange 30 is integrally connected to and extends outwardly from tubular body portion 24, and acts in conjunction with washer 28 to retain grommet 10 in the installed position with respect to the vehicle component 26. Body 12 also integrally includes a second tubular body portion 32 having legs 16 integrally extending therefrom. Second tubular body portion 32 has a diameter "G" (shown in FIG. 5) smaller than diameter "C" of first tubular body portion 32.

Figures 7, 8:
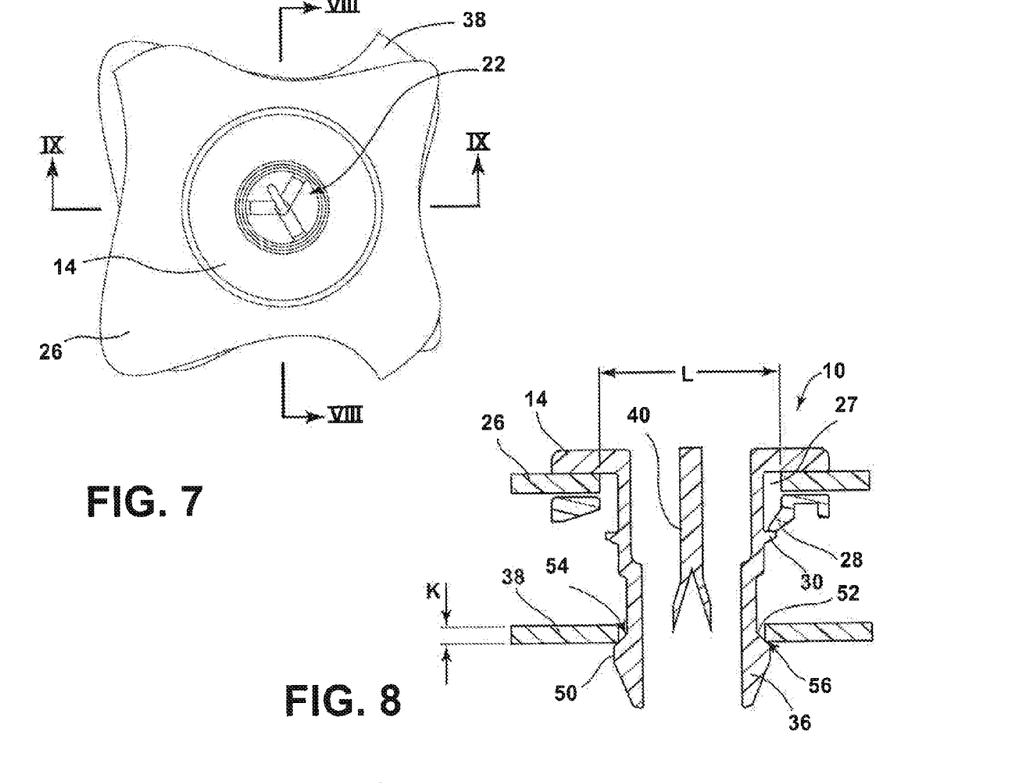
FIG. 7 is a top plan view of the grommet installation of FIG. 2.
FIG. 8 is a cross sectional end elevational view taken at section VIII of FIG. 7.

A conical shaped or angled engagement face 34 is provided on an outwardly bulging portion 36 of each of the legs 16 that during installation of grommet 10 assist in inwardly deflecting legs 16 during insertion into an aperture 52 (shown in FIG. 8) of a vehicle body panel 38. Grommet 10, having vehicle component 26 and washer 28 already connected, is then installed by inserting legs 16 into the aperture 52 of vehicle body panel 38 in the installation direction "A" by forcing legs 16 to elastically inwardly deflect toward each other such that bulging portions 36 slidingly fit through aperture 52.

In the grommet installed position, after legs 16 extend through aperture 52 created in the body panel 38, a contact face 37 of each bulging portion 36 directly contacts a first side or face 39 of the body panel 38, and the legs 16 elastically outwardly rebound substantially to their original non-deflected positions shown. The contact faces 37 thereafter act to resist removal or displacement of grommet 10 in release direction "B". A pull tab 40 (not clearly visible in this view) is positioned in a hollow bore 42 which can be a through-bore, shown more clearly in FIG. 3, of first tubular body portion 24 proximate to the body flange 14. The locating flange 20 of each of the legs 16 extends toward and can directly contact a second face 41 of body panel 38 which is oppositely facing with respect to body panel first face 39. The locating flanges 20 in combination with engagement faces 34 prevent grommet 10 from sliding in either the installation direction "A" or release direction "B" after installation of grommet 10, thereby minimizing vibration of the vehicle component 26.

Referring to FIG. 3 and again to FIG. 2, grommet 10 is intended to permit its subsequent removal together with vehicle component 26 and washer 28 from the installed position with respect to body panel 38. To accomplish removal, the pull tab 40 which is located in bore 42 proximate to flange 14 can be grasped using a tool such as a pair of pliers for example, and pulled in the release direction "B", opposite to installation direction "A". Grommet 10 is designed to be installed and removed multiple times. Pull tab 40 is integrally connected by individual tab extensions 44, 46, 48 only to individual ones of the legs 16, such that no portion of service tab assembly 22 including pull tab 40 and/or tab extensions 44, 46, 48 contacts flange 14 or either first or second tubular body portions 24, 32 in any position of the service tab assembly. By pulling on pull tab 40 in the release direction "B" the tab extensions 44, 46, 48 cause the legs 16 to displace toward each other by moving into the space provided by elongated slots 18, thereby allowing the bulging portion 36 of each of the legs 16 to clear aperture 52 of body panel 38. Pull tab 40 is integrally connected to a column shaped member 49 which in turn is integrally connected to each of the tab extensions 44, 46, 48. In the normal or recessed position of pull tab 40, substantially no portion of pull tab 40 extends outwardly of flange 14, such that in the installed position of grommet 10 shown in FIG. 2, flange 14 provides a finished appearance, and pull tab 40 cannot be deflected or grasped from outside a space envelope of flange 14.

Referring to FIG. 4 and again to FIGS. 1 and 2, diameter "C" of first tubular body portion 24 extends from flange 14 diametrically outward beyond second flange 30. Diameter "D" of second flange 30 is larger than diameter "C" such that second flange 30 extends diametrically/circumferentially outward beyond first tubular body portion 24. Each of the locating flanges 20 is integrally connected to second tubular body portion 32, extends toward the bulging portion 36 of each leg 16, and according to several aspects is oriented at an obtuse angle α with respect to second tubular body portion 32. Each of the bulging portions 36 extends outwardly with respect to second tubular body portion 32. The bulging portion 36 of each leg 16 begins at a distance "D" from flange 14 which is predetermined to provide clearance for deflection of the locating flanges 20 to reach the installed position shown in FIG. 2, as well as to provide for a length "F" of the elongated slots 18, defined as the overall length of the bulging portions 36 plus approximately 50% to 70% of a length of second tubular body portion 32. Length "F" is predetermined to provide for deflection of legs 16 sufficient to slidingly pass into or out of aperture 52 during installation and removal of grommet 10.

Figure 5:
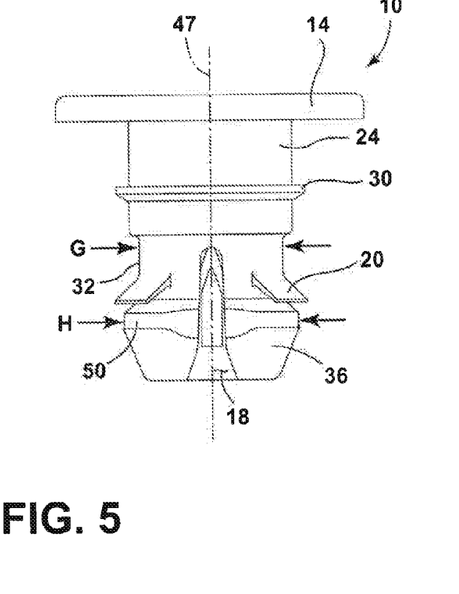
FIG. 5 is an end elevational view of the grommet of FIG. 3.

Referring to FIG. 5, diameter "G" of second tubular body portion 32 is continuous between first tubular body portion 24 and the bulging portions 36. Each of the bulging portions 36 includes a curved portion 50, and in a non-deflected position of legs 16, the curved portions 50 of all of the legs 16 together define a maximum diameter "H" which is greater than a diameter of the aperture 52 created in body panel 38. Each of the first and second tubular body portions 24, 32 and the legs 16 are spaced with respect to and commonly share a longitudinal central axis 47 of tubular body 12.

Figure 3:
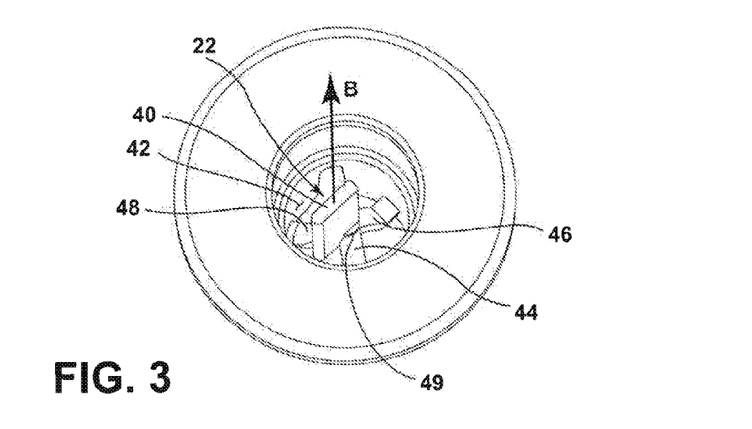
FIG. 3 is a top perspective view of the grommet of FIG. 1.
Figure 6:
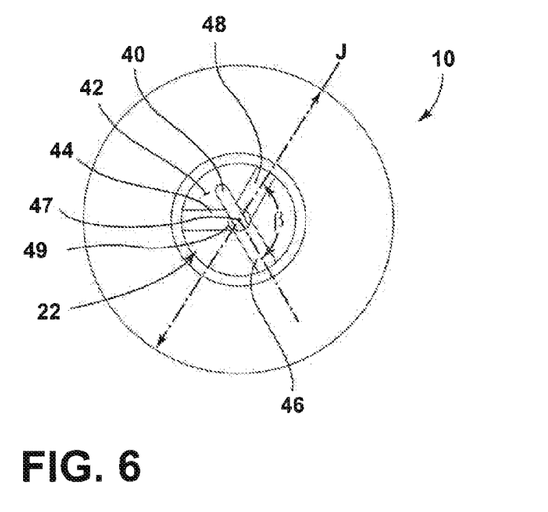
FIG. 6 is a top plan view of the grommet of FIG. 3.

Referring to FIG. 6 and again to FIGS. 1, 3 and 5, service tab assembly 22 as previously noted is created by integrally connecting pull tab 40 to member 49 and to each of the tab extensions 44, 46, 48, having the tab extensions 44, 46, 48 integrally connected to individual legs 16 axially past (in the installation direction "A" moving away from flange 14) and interior of the curved portion 50 of bulging portions 36. Successive ones of tab extensions 44, 46, 48 are separated by an angle β which is approximately 120 degrees when three tab extensions 44, 46, 48 are used, but can vary depending on the quantity of tab extensions and legs 16. Column shaped member 49 is coaxially located with respect to the longitudinal central axis 47 of tubular body 12 so that pull tab 40 when pulled parallel to the longitudinal central axis of tubular body 12 provides substantially equal force to each of the tab extensions 44, 46, 48.

Referring to FIG. 7 and again to FIG. 2, in the installed position, grommet 10 retains vehicle component 26 with respect to vehicle body panel 38 by spreading a retaining load using flange 14 to vehicle component 26. In the installed position, the service tab assembly 22 is accessible from the vehicle component 26 side.

Figure 4:
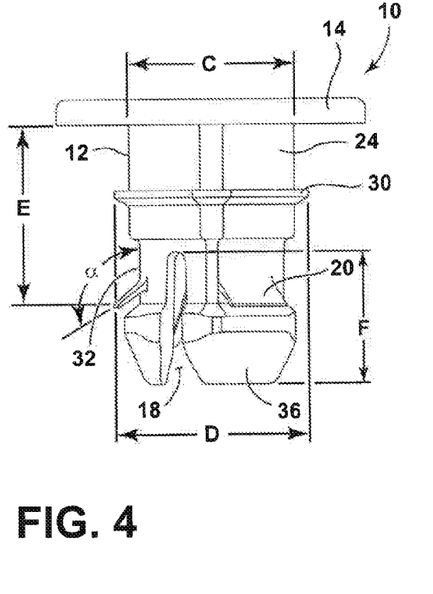
FIG. 4 is a front elevational view of the grommet of FIG. 3.

Referring to FIG. 8 and again to FIGS. 2, 4 and 5, in the installed position vehicle component 26 is held in position by engagement of washer 28 with second flange 30. In lieu of a square or flat face for each contact face 37, each bulging portion 36 can have a tapered or angled contact face 54 extending conically outward from second tubular body portion 32 to each curved portion 50, to reduce friction during removal of legs 16 past a corner 56 defined by aperture 52. Use of angled contact face 54 may also be beneficial in further reducing friction during removal of grommet 10 as a thickness "K" of vehicle body panel 38 increases. The diameter "D" of second flange 30 and the maximum diameter "H" defined by bulging portions 36 in the non-deflected position of legs 16 are each less than a diameter "L" of aperture 27 of vehicle component 26, to provide clearance for installation of grommet 10.

Referring to FIG. 9 and again to FIGS. 1, 3, 5 and 6, in the installed position of grommet 10, each locating flange 20 can elastically deflect when in contact with second face 41 of vehicle body panel 38 to provide a biasing force acting in a force direction "M" that holds grommet 10 in contact against vehicle body panel 38. When pull tab 40 is manually pulled in the release direction "B", the displacement of pull tab 40 acts to displace each of the tab extensions 44, 46, 48 (only tab extension 44 is clearly visible in FIG. 9) in an inward direction "N" toward the longitudinal central axis 47 of body 12, which displaces the curved portion 50 of each of the bulging portions 36 away from direct engagement with an inner wall 58 of aperture 52. Because the components of service tab assembly 22 are connected only to the legs 16, all of a force applied to pull tab 40 acts through the tab extensions 44, 46, 48 and therefore acts only with respect to legs 16. This minimizes the force required to release legs 16.

Figure 9:
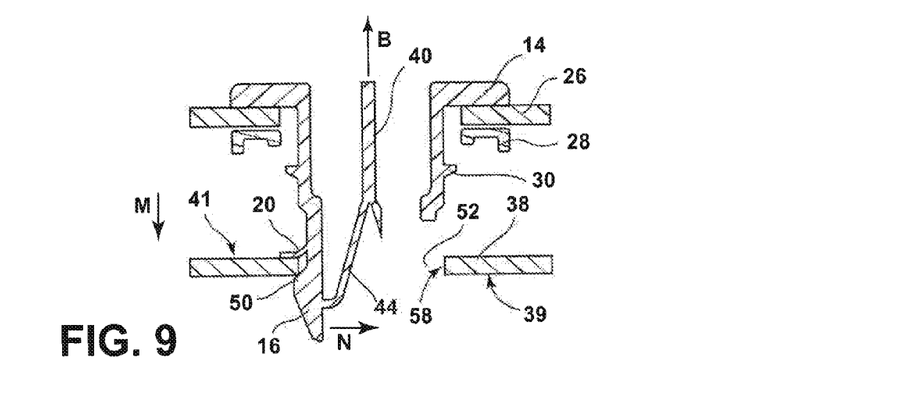
FIG. 9 is a cross sectional front elevational view taken at section IX of FIG. 7.

It is also noted that due to the positioning of the components of service tab assembly 22 entirely within bore 42, having no direct connection to flange 14 or first or second tubular body portions 24, 32, no force is directly applied to and no displacement of flange 14 is required to move legs 16 for release from their engaged positions with body panel 38. Flange 14 and vehicle component 26 are not directly contacted during use of the tool for removal of grommet 10, therefore flange 14 and vehicle component 26 are not physically marred or damaged during removal of grommet 10. In addition, the force acting only in release direction "B" during removal of grommet 10 does not result in axial rotation or bending of grommet 10. Removal of grommet 10 therefore does not include application of force to either body panel 38 or vehicle component 26 which could damage body panel 38 or its aperture 52, or the vehicle component 26 or its aperture 27.

Figure 10:
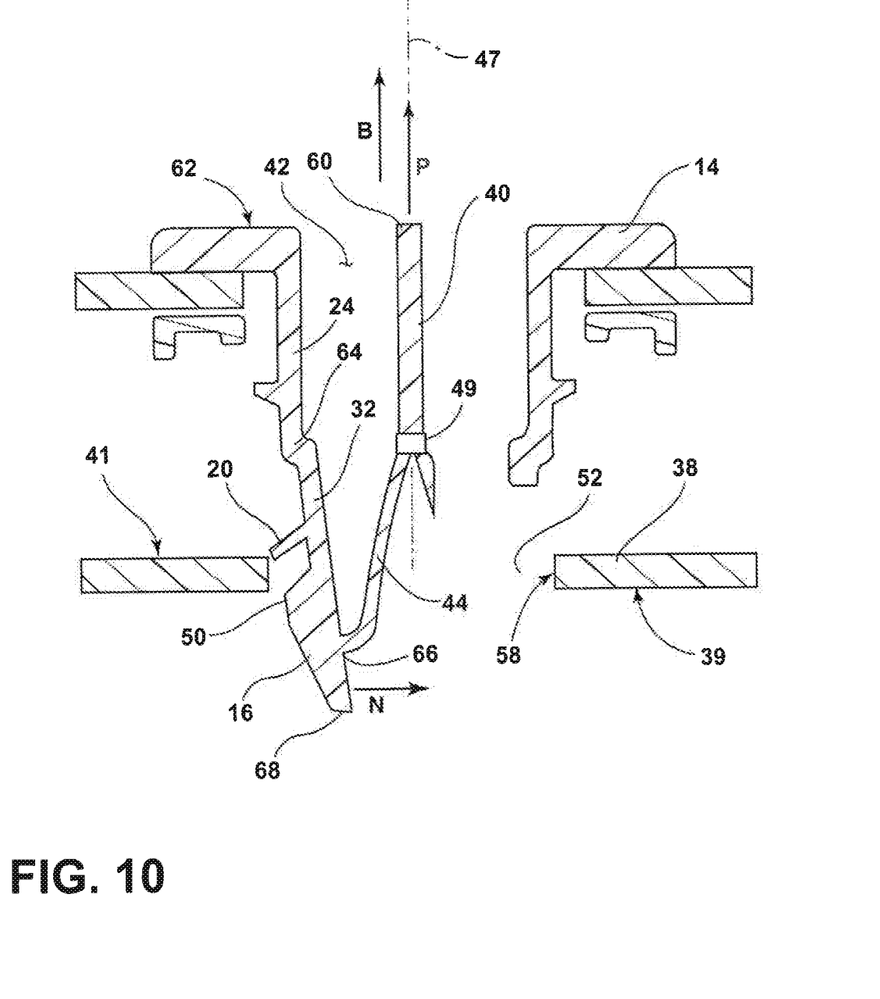
FIG. 10 is a cross sectional front elevational view similar to FIG. 9 after inward deflection of one of the legs permitting removal of the grommet.

Referring to FIG. 10 and again to FIGS. 1, 3, 5-6 and 9, one of the legs 16 of grommet 10 is shown during the initial stage of removal. The remaining legs are similarly actuated. A force "P" applied to pull tab 40 parallel to the release direction "B" displaces pull tab 40 in the release direction "B", thereby moving a free end 60 of pull tab 40 outside of the bore 42 and above a plane defined by an outer facing surface 62 of flange 14. By positioning column shaped member 49 substantially in coaxial alignment with longitudinal central axis 47 during injection molding of grommet 10, force "P" is equally divided into each of the tab extensions 44, 46, 48 to provide equal inward bending for each of the legs 16. By the integral connection of pull tab 40 to the tab extensions 44, 46, 48 (only tab extension 44 is shown for clarity) at a connection location 66, force "P" induces bending of both leg 16 and second tubular body portion 32 of body 12, primarily occurring proximate to a junction 64 between the first and second tubular body portions 24, 32. The tab extension 44 (similar to tab extensions 46, 48) is integrally connected at connection location 66 to leg 16 proximate to a free end 68 of leg 16 to maximize the bending moment at junction 64. As leg 16 elastically deflects in the inward direction "N" toward longitudinal central axis 47, the locating flange 20 releases from the second face 41 of body panel 38, and returns to its non-deflected condition shown. Curved portion 50 moves toward the longitudinal central axis 47, thereby providing sliding clearance between the inner wall 58 of aperture 52 and the curved portion 50 such that leg 16 can be subsequently further pulled in the release direction "B" to remove tubular body 12 from aperture 52.

In a pre-installation or as-molded condition shown in FIGS. 1-9, grommets 10 of the present disclosure include flange 14 having tubular body 12 integrally connected to the flange 14. The tubular body 12 has a central hollow bore 42 such as a through-bore. The tubular body 12 and the bore 42 are coaxially aligned with a longitudinal central axis 47 of the tubular body 12. Multiple legs 16 are created in the tubular body 12 with successive ones of the legs 16 separated by an elongated slot 18 permitting each of the legs 16 to inwardly deflect from a non-deflected position toward the longitudinal central axis 47. A service tab assembly 22 in the initial or non-deflected condition can be positioned entirely in the bore 42. The service tab assembly 22 includes multiple tab extensions 44, 46, 48, each integrally connected to only one of the legs 16. A pull tab 40 is positioned entirely in the bore 42 in a non-extended position (shown in FIGS. 8-9), and is connected only to each of the tab extensions 44, 46, 48. The pull tab 40 when displaced in a release direction "B" acts through the tab extensions 44, 46, 48 to inwardly displace each of the legs 16 toward the longitudinal central axis 47.

Grommets 10 of the present disclosure offer several advantages. By positioning service tab assembly 22 in an inner bore of the grommet, the service tab assembly 22 when pulled in a release direction acts to contract deflectable legs 16 of the grommet to permit the legs 16 to be pulled free of body panel aperture 52, thereby providing for removal of the grommet. A locating flange 20 extending from each leg 16 prevents movement of the grommet from causing vibration of a component held in place by the grommet, such as vehicle component 26. A service tab assembly has a pull tab positioned in the grommet inner bore that is itself connected using individual tab extensions 44, 46, 48 to inner walls of each of the legs 16 convert displacement of the pull tab 40 into inward deflection of each of the legs for removal. Grommet 10 includes all of the features identified allowing for its removal, with the exception of the separate washer 28, all integrally included in a single molded plastic part.

The grommet is inserted into an aperture of the air shield and held onto the air shield by a separate plastic washer positioned on an opposite side of the air shield. The air shield with grommets 10 attached is then shipped for installation to a vehicle assembly plant where the air shield is held in place on the vehicle using several of the grommets and then followed up with additional metal fasteners to fix the air shield in place.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A grommet, comprising:
    a tubular body having a bore coaxially aligned with a body longitudinal central axis;
    multiple legs extending from the tubular body; and
    a service tab assembly positioned in the bore, the service tab assembly including:
    multiple tab extensions, each integrally connected to only one of the legs; and
    a pull tab in a non-extended position located entirely in the bore, and connected only to each of the tab extensions, the pull tab when displaced in a release direction acting through the tab extensions to inwardly deflect each of the legs toward the longitudinal central axis.

2. The grommet of claim 1, wherein the tubular body includes:
    a first tubular body portion; and
    a second tubular body portion integrally connected to the first tubular body portion, the legs each being integrally connected to the second tubular body portion.

3. The grommet of claim 2, wherein the first tubular body portion has a diameter larger than a diameter of the second tubular body portion.

4. The grommet of claim 1, further including a flange integrally connected to the body and oriented perpendicular to the longitudinal central axis, the bore extending also through the flange.

5. The grommet of claim 4, wherein the pull tab is positioned in the bore proximate to the flange in the non-extended position.

6. The grommet of claim 4, wherein the pull tab at least partially extends outside of the bore when displaced in the release direction.

7. The grommet of claim 1, wherein the release direction is coaxial with respect to the longitudinal central axis such that a force applied to the pull tab in the release direction is equally distributed to each of the tab extensions.

8. The grommet of claim 1, further including a column-shaped member integrally connecting the pull tab to each of the tab extensions, the member oriented in coaxial alignment with the longitudinal central axis.

9. The grommet of claim 1, wherein the grommet is made entirely of a polymeric material having the tubular body, the legs and the service tab assembly integrally connected together.

10. A grommet, comprising:
    a tubular body having a through-bore coaxially aligned with a body longitudinal central axis;
    a first flange integrally connected to the body and oriented perpendicular to the longitudinal central axis, the through-bore extending also through the first flange;
    multiple legs extending integrally from the body at a body free end oppositely positioned with respect to the flange, the legs deflectable toward a body longitudinal axis; and
    a service tab assembly positioned in the through-bore, the service tab assembly including:

multiple tab extensions, each integrally connected to only one of the legs; and a pull tab positioned entirely in the through-bore in a non-extended position, and connected only to each of the tab extensions, the pull tab when displaced in a release direction acting through the tab extensions to equally inwardly displace each of the legs toward the longitudinal axis.

11. The grommet of claim 10, wherein the pull tab is integrally connected to a column shaped member coaxially aligned with the longitudinal axis.

12. The grommet of claim 11, wherein each of the tab extensions is integrally connected to the column shaped member such that a force applied to the pull tab acting coaxial to the longitudinal axis is equally distributed to each of the legs.

13. The grommet of claim 12, wherein each of the tab extensions is integrally connected at a connecting location proximate to a free end of one of the legs to maximize a bending moment applied by the tab extensions to the legs.

14. The grommet of claim 10, wherein successive ones of the legs are separated by an elongated slot permitting each of the legs to inwardly deflect from a non-deflected position toward the longitudinal axis by partially extending into the slot.

15. The grommet assembly of claim 14, wherein each elongated slot between successive ones of the legs includes an open end which is wider than a closed end.

16. The grommet of claim 10, further including:
a first tubular body portion integrally connected to the flange; and
a second tubular body portion integrally connected to the first tubular body portion, the legs each integrally connected to the second tubular body portion;
wherein each elongated slot extends at least partially into the second tubular body portion.

17. The grommet of claim 10, further including:
an angled engagement face provided on an outwardly bulging portion of each of the legs facing toward the first flange; and
a second flange integrally outwardly extending from a first tubular body portion of the body, the second flange positioned between the angled engagement face and the first flange.

18. The grommet of claim 10, further including:
an angled engagement face provided on an outwardly bulging portion of each of the legs facing toward the first flange; and
a locating flange integrally connected to and extending outwardly from each of the legs, the locating flange angularly oriented with respect to the longitudinal axis and facing the angled engagement face.

19. The grommet assembly of claim 18, further including a column shaped member integrally connecting the pull tab to each of the tab extensions such that a force applied to the pull tab acting coaxial to the longitudinal axis is equally distributed to each of the legs through the tab extensions.

20. The grommet assembly of claim 18, wherein the pull tab is displaceable to a position partially extending outward from the through-bore and beyond a plane defined by a surface of the first flange in an extended condition of the pull tab operating to inwardly displace the legs.

21. A grommet assembly, comprising:
a grommet including:
a tubular body having a bore coaxially aligned with a body longitudinal central axis;
a flange integrally connected to the body, the bore extending also through the flange;
multiple legs extending integrally from the tubular body; and
a service tab assembly positioned entirely in the bore in a non-extended condition, the service tab assembly including:
multiple tab extensions, each integrally connected to only one of the legs; and
a pull tab connected only to each of the tab extensions;
a vehicle component having an aperture, the tubular body slidingly received in the aperture until the flange contacts the vehicle component; and
a vehicle body panel having a panel aperture, the legs extending through the panel aperture, the pull tab when displaced in a release direction acting through the tab extensions to equally inwardly displace each of the legs toward the longitudinal axis such that the legs are slidable through the panel aperture to release the grommet.

22. The grommet assembly of claim 21, wherein each leg includes a bulging portion located proximate to a free end of the leg, a contact face of each bulging portion directly contacting a first side of the body panel.

23. The grommet assembly of claim 22, further including a locating flange integrally connected to and extending outwardly from each of the legs, each locating flange angularly oriented with respect to the longitudinal axis and facing the contact face, each locating flange directly contacting a second side of the body panel oppositely facing with respect to the first side.

* * * * *

UNITED STATES PATENT AND TRADEMARK OFFICE
CERTIFICATE OF CORRECTION

PATENT NO. : 8,622,680 B1  Page 1 of 1
APPLICATION NO. : 13/535764
DATED : January 7, 2014
INVENTOR(S) : Tien T. Diep et al.

It is certified that error appears in the above-identified patent and that said Letters Patent is hereby corrected as shown below:

Title Page, following Item (22), insert the following:

--(65) Prior Publication Data

US 2014/0003884 A1    Jan. 2, 2014--.

Signed and Sealed this
Twenty-seventh Day of May, 2014

Michelle K. Lee
*Deputy Director of the United States Patent and Trademark Office*